United States Patent
Noda (10) Patent No.: US 12,427,487 B2
(45) Date of Patent: Sep. 30, 2025

(54) GAS SEPARATION APPARATUS AND METHOD OF GAS SEPARATION

(71) Applicant: NGK INSULATORS, LTD., Nagoya (JP)

(72) Inventor: Kenichi Noda, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 41 days.

(21) Appl. No.: 18/592,597

(22) Filed: Mar. 1, 2024

(65) Prior Publication Data

US 2024/0198295 A1    Jun. 20, 2024

Related U.S. Application Data

(63) Continuation of application No. 16/935,553, filed on Jul. 22, 2020, now Pat. No. 11,986,778, which is a
(Continued)

(30) Foreign Application Priority Data

Feb. 15, 2018  (JP) ................. 2018-024973

(51) Int. Cl.
   *B01D 71/02*   (2006.01)
   *B01D 53/22*   (2006.01)
   *B01D 69/10*   (2006.01)

(52) U.S. Cl.
   CPC ....... *B01D 71/0215* (2022.08); *B01D 53/228* (2013.01); *B01D 69/108* (2022.08);
(Continued)

(58) Field of Classification Search
   None
   See application file for complete search history.

(56) References Cited

U.S. PATENT DOCUMENTS

| | | | |
|---|---|---|---|
| 11,986,778 B2 * | 5/2024 | Noda | ................. B01D 69/108 |
| 2016/0008771 A1 | 1/2016 | Yajima et al. | |

(Continued)

FOREIGN PATENT DOCUMENTS

| | | |
|---|---|---|
| EP | 3 640 209 A1 | 4/2020 |
| JP | H10-114516 A1 | 5/1998 |

(Continued)

OTHER PUBLICATIONS

Ting Wu, et al., "Influence of Propane on $CO_2/CH_4$ and $N_2/CH_4$ Separations in CHA Zeolite Membranes," *Journal of Membrane Science*, 473 (2015), pp. 201-209.
(Continued)

*Primary Examiner* — Chester T Barry
(74) *Attorney, Agent, or Firm* — BURR PATENT LAW, PLLC (57) ABSTRACT

A gas separation apparatus includes a gas supply part and a zeolite membrane. The gas supply part supplies a mixed gas at a pressure greater than or equal to 10 atm and less than or equal to 200 atm. The mixed gas contains at least $CH_4$, $CO_2$, and $N_2$. A water content of the mixed gas is made less than or equal to 3000 ppm. The zeolite membrane allows $CO_2$ and $N_2$ in the mixed gas to permeate therethrough, to thereby separate $CO_2$ and $N_2$ from $CH_4$. The zeolite membrane is made of zeolite. The zeolite contains Al. A ratio of alkali metal to whole framework elements in the zeolite is less than or equal to 6.0 mol %. An amount of substance of the alkali metal in the zeolite is less than an amount of substance of Al.

13 Claims, 2 Drawing Sheets

Related U.S. Application Data continuation of application No. PCT/JP2019/004202, filed on Feb. 6, 2019.

(52) U.S. Cl.
CPC ...... *B01D 71/028* (2013.01); *B01D 2053/221* (2013.01); *B01D 2257/102* (2013.01); *B01D 2257/504* (2013.01); *B01D 2311/10* (2013.01)

(56) References Cited

U.S. PATENT DOCUMENTS

| 2017/0291135 A1 | 10/2017 | Noda |
| 2017/0327758 A1 | 11/2017 | Tanaka et al. |

FOREIGN PATENT DOCUMENTS

| JP | 2007-091507 A1 | 4/2007 |
| JP | 2012-066242 A1 | 4/2012 |
| JP | 2016-108418 A1 | 6/2016 |
| JP | 2017-018844 A1 | 1/2017 |
| JP | 2017-131849 A1 | 8/2017 |
| JP | 2017-131887 A1 | 8/2017 |
| WO | 2014/088756 A1 | 6/2014 |
| WO | 2014/157701 A1 | 10/2014 |
| WO | 2016/121889 A1 | 8/2016 |

OTHER PUBLICATIONS

J. van den Bergh, et al., "Separation and Permeation Characteristics of a DD3R Zeolite Membrane," *Journal of Membrane Science*, 316 ( 2008), pp. 35-45.

International Search Report and Written Opinion (Application No. PCT/JP2019/004202) dated Apr. 16, 2019.

English translation of International Preliminary Report on Patentability (Chapter I) (Application No. PCT/JP2019/004202) dated Aug. 27, 2020.

Japanese Office Action (Application No. 2020-500431) dated Jul. 26, 2021 (with English translation).

German Office Action (Application No. 11 2019 000 832.3) dated Dec. 3, 2021 (with English translation).

\* cited by examiner

GAS SEPARATION APPARATUS AND METHOD OF GAS SEPARATION

CROSS REFERENCE TO RELATED APPLICATIONS

This application is a continuation of U.S. application Ser. No. 16/935,553, filed Jul. 22, 2020, which in turn is a continuation of International Application No. PCT/JP2019/004202, filed Feb. 6, 2019, and claims the benefit of Japanese Application No. 2018-024973, the entireties of which are incorporated herein by reference.

FIELD OF THE INVENTION

The present invention relates to a technique for separating gas.

BACKGROUND OF THE INVENTION

In separation facilities for gas from partial combustion furnaces or the like, separation of carbon dioxide ($CO_2$), nitrogen ($N_2$), and hydrocarbon such as methane ($CH_4$) in the gas has conventionally been performed. A membrane separation method using molecular sieving function of a zeolite membrane formed on a porous support is known as one of gas separation methods.

For example, "Influence of propane on $CO_2/CH_4$ and $N_2/CH_4$ separations in CHA zeolite membranes" by Ting Wu and other six members, Journal of Membrane Science 473 (2015), pages 201-209 (literature 1), and "Separation and permeation characteristics of a DD3R zeolite membrane" by J. van den Bergh and other four members, Journal of Membrane Science 316 (2008), pages 35-45 (literature 2), disclose a method for removing $CO_2$ from a mixed gas of $CH_4$ and $CO_2$, and a method for removing $N_2$ from a mixed gas of $CH_4$ and $N_2$, by using with a zeolite membrane.

SUMMARY OF THE INVENTION

In order to remove $CO_2$ and $N_2$ from a gas containing $CH_4$, $CO_2$, and $N_2$, the methods of the above literature 1 and 2 require a separation membrane for removing $CO_2$ and a separation membrane for removing $N_2$. Therefore, the separation apparatus becomes large size and complicated. When trying to simultaneously remove $CO_2$ and $N_2$ by using a zeolite membrane, there is a case where efficient separation of $N_2$ becomes difficult because $CO_2$ having high adsorptivity inhibits the permeation of $N_2$. Thus, there is demand for a technique for simultaneously and efficiently separating $CO_2$ and $N_2$ from a gas containing $CH_4$, $CO_2$, and $N_2$ by using a zeolite membrane.

The present invention has been made in light of the above-described problems, and it is an object of the present invention to simultaneously and efficiently separate $CO_2$ and $N_2$ from a mixed gas.

A gas separation apparatus according to a preferable embodiment of the present invention includes a gas supply part that supplies a mixed gas containing at least methane, carbon dioxide, and nitrogen at a pressure greater than or equal to 10 atm and less than or equal to 200 atm, a water content of the mixed gas being less than or equal to 3000 ppm, and a separation membrane that allows carbon dioxide and nitrogen in the mixed gas to permeate therethrough, to thereby separate carbon dioxide and nitrogen from methane. The separation membrane is made of zeolite. The zeolite contains aluminum. A ratio of alkali metal to whole framework elements in the zeolite is less than or equal to 6.0 mol %. In the zeolite, an amount of substance of the alkali metal is less than an amount of substance of the aluminum. It is therefore possible to simultaneously and efficiently separate $CO_2$ and $N_2$ from the mixed gas.

Preferably, a concentration of carbon dioxide in the mixed gas is greater than or equal to 10%, and a concentration of nitrogen in the mixed gas is greater than or equal to 3%.

Preferably, a temperature of the mixed gas is higher than or equal to 40° C. and lower than or equal to 200° C.

Preferably, the mixed gas further contains C2 or heavier hydrocarbon.

Preferably, the separation membrane is a membrane of the zeolite formed on a porous support.

Preferably, a maximum number of membered ring in the zeolite is 6 or 8.

Preferably, the zeolite contains aluminum, and silicon wherein an amount of substance of the silicon is 5 times or more and 1000 times or less an amount of substance of the aluminum, or phosphorus wherein an amount of substance of the phosphorus is 0.7 times or more and 1.5 times or less an amount of substance of the aluminum.

Preferably, a ratio of alkaline earth metal to whole framework elements in the zeolite is less than or equal to 0.2 mol %.

Preferably, the separation membrane allows 60% or more of carbon dioxide and 30% or more of nitrogen in the mixed gas to permeate therethrough.

The present invention is also intended for a method of gas separation. The method of gas separation according to a preferable embodiment of the present invention includes a) supplying a mixed gas containing at least methane, carbon dioxide, and nitrogen at a pressure greater than or equal to 10 atm and less than or equal to 200 atm, a water content of the mixed gas being less than or equal to 3000 ppm, and b) allowing carbon dioxide and nitrogen in the mixed gas to permeate a separation membrane, to thereby separate carbon dioxide and nitrogen from methane. The separation membrane is made of zeolite. The zeolite contains aluminum. A ratio of alkali metal to whole framework elements in the zeolite is less than or equal to 6.0 mol %. In the zeolite, an amount of substance of the alkali metal is less than an amount of substance of the aluminum. It is therefore possible to simultaneously and efficiently separate $CO_2$ and $N_2$ from the mixed gas.

Preferably, a concentration of carbon dioxide in the mixed gas is greater than or equal to 10%, and a concentration of nitrogen in the mixed gas is greater than or equal to 3%.

Preferably, a temperature of the mixed gas is higher than or equal to 40° C. and lower than or equal to 200° C.

Preferably, the mixed gas further contains C2 or heavier hydrocarbon.

Preferably, a maximum number of membered ring in the zeolite is 6 or 8.

Preferably, a ratio of alkaline earth metal to whole framework elements in the zeolite is less than or equal to 0.2 mol %.

Preferably, the method of gas separation further includes c) synthesizing the zeolite before the operation b). The zeolite is brought into contact with a liquid mainly composed of water in the operation c), the liquid not containing organic acid, having a pH greater than or equal to 4.0 and less than or equal to 6.5, and having a temperature higher than or equal to 40° C.

Preferably, the zeolite contains aluminum, and silicon wherein an amount of substance of the silicon is 5 times or more and 1000 times or less an amount of substance of the aluminum, or phosphorus wherein an amount of substance of the phosphorus is 0.7 times or more and 1.5 times or less an amount of substance of the aluminum.

Preferably, the separation membrane allows 60% or more of carbon dioxide and 30% or more of nitrogen in the mixed gas to permeate therethrough.

The present invention is also intended for a gas separation membrane. The gas separation membrane according to a preferable embodiment of the present invention includes a support, and a membrane formed on the support, being made of zeolite. The zeolite contains aluminum. A percentage of phosphorus in whole T atoms in the zeolite is less than or equal to 3.0 mol %. A ratio of alkali metal to whole framework elements in the zeolite is less than or equal to 6.0 mol %. A ratio of alkaline earth metal to whole framework elements in the zeolite is less than or equal to 0.2 mol %. In the zeolite, an amount of substance of the alkali metal is less than an amount of substance of the aluminum.

Preferably, a maximum number of membered ring in the zeolite is 6 or 8.

Preferably, a pore diameter of the zeolite is greater than or equal to 0.2 nm and less than 0.4 nm.

These and other objects, features, aspects and advantages of the present invention will become more apparent from the following detailed description of the present invention when taken in conjunction with the accompanying drawings.

DETAILED DESCRIPTION OF THE INVENTION

Figure 1:
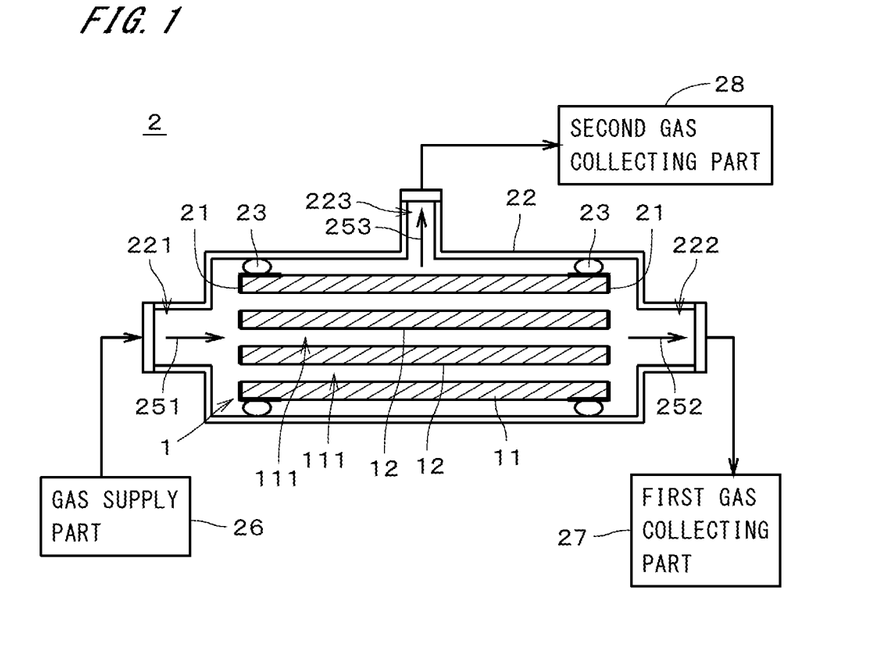
FIG. 1 is a view of a gas separation apparatus.

FIG. 1 is a schematic structure of a gas separation apparatus 2 according to an embodiment of the present invention. The gas separation apparatus 2 is an apparatus for separating carbon dioxide ($CO_2$) and nitrogen ($N_2$) from a mixed gas containing methane ($CH_4$), $CO_2$, and $N_2$, to extract $CH_4$.

The gas separation apparatus 2 includes the zeolite membrane complex 1, sealing parts 21, a housing 22, seal members 23, a gas supply part 26, a first gas collecting part 27, and a second gas collecting part 28. The zeolite membrane complex 1, the sealing parts 21, and the seal members 23 are placed inside the housing 22. The gas supply part 26, the first gas collecting part 27, and the second gas collecting part 28 are disposed outside the housing 22 and connected to the housing 22.

Figure 2:
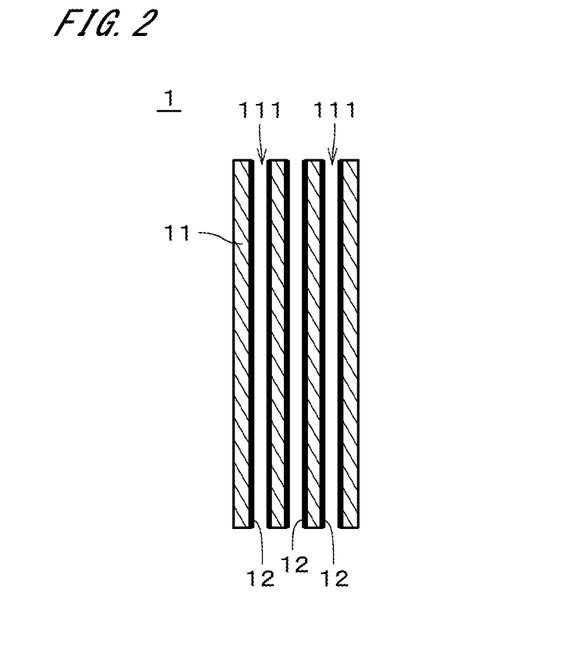
FIG. 2 is a sectional view of a zeolite membrane complex.
Figure 3:
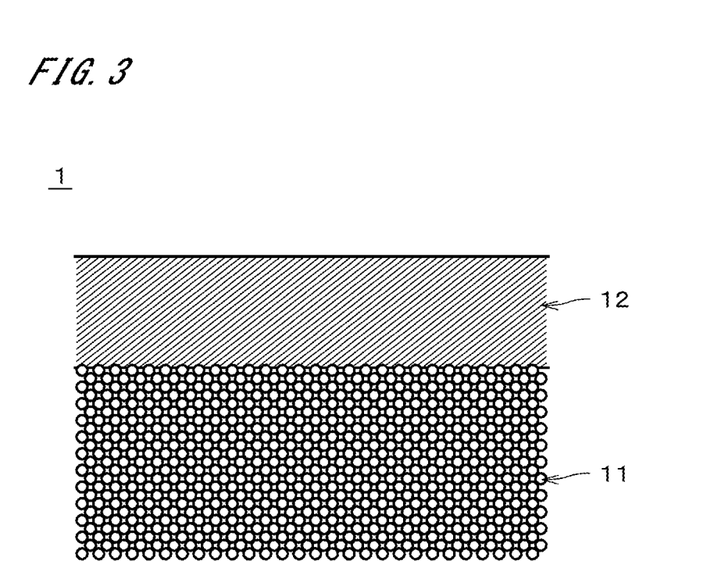
FIG. 3 is an enlarged sectional view of the zeolite membrane complex.

FIG. 2 is a sectional view of the zeolite membrane complex 1. FIG. 3 is a sectional view of part of the zeolite membrane complex 1 in enlarged dimensions. The zeolite membrane complex 1 includes a porous support 11 and a zeolite membrane 12 (i.e., film-shaped zeolite) formed on the support 11. In the example illustrated in FIG. 2, the support 11 is a monolith support, having a substantially circular columnar shape, where a plurality of through holes 111 each extending in a longitudinal direction (i.e., the vertical direction in the drawing) are formed in an integral columnar body that is molded integrally. Each through hole 111 (i.e., cell) has, for example, a substantially circular cross-section perpendicular to the longitudinal direction. In the illustration of FIG. 2, the diameter of the through holes 111 is greater than the actual diameter, and the number of through holes 111 is smaller than the actual number.

The support 11 has a length of, for example, 10 cm to 200 cm. The support 11 has an outer diameter of, for example, 0.5 cm to 30 cm. When the support 11 has a monolith-like shape, the distance between the central axes of each pair of adjacent through holes is, for example, in the range of 0.3 mm to 10 mm. The surface roughness (Ra) of the support 11 is, for example, in the range of 0.1 μm to 5.0 μm and preferably in the range of 0.2 μm to 2.0 μm. Alternatively, the support 11 may have a different shape such as a honeycomb shape, a flat plate shape, a tubular shape, a circular cylindrical shape, a circular columnar shape, or a polygonal prism shape. When having a tubular shape or a circular cylindrical shape, the support 11 has a thickness of, for example, 0.1 mm to 10 mm.

As the material for the support 11, various substances (e.g., a ceramic or a metal) may be employed as long as they have chemical stability in the step of forming the zeolite membrane 12 on the surface. In the present embodiment, the support 11 is formed of a ceramic sintered compact. Examples of the ceramic sintered compact to be selected as the material for the support 11 include alumina, silica, mullite, zirconia, titania, yttria, silicon nitride, and silicon carbide. In the present embodiment, the support 11 contains at least one of alumina, silica, and mullite.

The support 11 may contain an inorganic binder. The inorganic binder may be at least one of titania, mullite, easily sinterable alumina, silica, glass frit, clay minerals, and easily sinterable cordierite.

The mean pore diameter of the support 11 is, for example, in the range of 0.01 μm to 70 μm and preferably in the range of 0.05 μm to 25 μm. The mean pore diameter of the support 11 in the vicinity of the surface where the zeolite membrane 12 is formed is in the range of 0.01 μm to 1 μm and preferably in the range of 0.05 μm to 0.5 μm. The mean pore diameters can be measured by, for example, a mercury porosimeter, a perm porosimeter, or a nano-perm porosimeter. As to a pore size distribution of the support 11 as a whole including the surface and inside of the support 11, D5 is in the range of, for example, 0.01 μm to 50 μm, D50 is in the range of, for example, 0.05 μm to 70 μm, and D95 is in the range of, for example, 0.1 μm to 2000 μm. The porosity of the support 11 in the vicinity of the surface where the zeolite membrane 12 is formed is, for example, in the range of 25% to 50%.

The support 11 has, for example, a multilayer structure in which a plurality of layers having different mean pore diameters are laminated one above another in a thickness direction. A surface layer that includes the surface where the zeolite membrane 12 is formed has a smaller mean pore diameter and a smaller sintered particle diameter than the remaining layers other than the surface layer. The mean pore diameter of the surface layer of the support 11 is, for example, in the range of 0.01 μm to 1 μm and preferably in the range of 0.05 μm to 0.5 μm. In the case where the support 11 has a multilayer structure, the material for each layer may be any of the above-described materials. The plurality of layers forming the multilayer structure may be formed of the same material, or may be formed of different materials.

The zeolite membrane 12 is formed on the inner surfaces of the through holes 111 and covers substantially the entire inner surfaces of the through holes 111. The zeolite membrane 12 refers to at least a zeolite formed in a membrane on the surface of the support 11, and does not include zeolite particles that are merely dispersed in an organic membrane. The zeolite membrane 12 may include two or more types of zeolites having different structures or compositions. In FIG. 2, the zeolite membrane 12 is illustrated with bold lines. The zeolite membrane 12 is a molecular separation membrane that separates molecules of different types, using a molecular sieving function. Specifically, the zeolite membrane 12 is less permeable to $CH_4$ than to $CO_2$ and $N_2$. In other words, the permeation amount of $CH_4$ through the zeolite membrane 12 is less than the permeation amount of $CO_2$ and less than the permeation amount of $N_2$. That is, the zeolite membrane 12 is a separation membrane that allows permeation of $CO_2$ and $N_2$ in the mixed gas containing $CH_4$, $CO_2$, and $N_2$, to thereby separate $CO_2$ and $N_2$ from $CH_4$.

The maximum number of membered ring in the zeolite constituting the zeolite membrane 12 is preferably 6 or 8. More preferably, the zeolite membrane 12 is the zeolite having 8-membered rings as the largest ring. Note that an n-membered ring refers to a ring in which n oxygen atoms constitute the framework of a pore and each oxygen atom is bonded together with T atoms described later to form a ring structure. The n-membered ring also refers to a ring that forms a through hole (channel), and does not include a ring that fails to form a through hole.

The zeolite membrane 12 is made of, for example, a DDR-type zeolite. In other words, the zeolite membrane 12 is made of a zeolite having a framework type code "DDR" assigned by the International Zeolite Association. The zeolite membrane 12 may be any type of zeolite, for example, AEI-type, AEN-type, AFN-type, AFV-type, AFX-type, CHA-type, ERI-type, ETL-type, GIS-type, LEV-type, LTA-type, PAU-type, RHO-type, SAT-type, and SOD-type. More preferably, the zeolite membrane 12 is any type of zeolite, for example, AEI-type, AFN-type, AFV-type, AFX-type, CHA-type, DDR-type, ERI-type, ETL-type, GIS-type, LEV-type, LTA-type, PAU-type, RHO-type, and SAT-type. Yet more preferably, the zeolite membrane 12 is any type of zeolite, for example, AEI-type, AFN-type, AFV-type, AFX-type, CHA-type, DDR-type, ERI-type, ETL-type, GIS-type, LEV-type, PAU-type, RHO-type, and SAT-type.

The thickness of the zeolite membrane 12 is, for example, in the range of 0.05 μm to 30 μm, preferably in the range of 0.1 μm to 20 μm, and more preferably in the range of 0.5 μm to 10 μm. As the thickness of the zeolite membrane 12 increases, separation performance improves. As the thickness of the zeolite membrane 12 decreases, permeance increases. The surface roughness (Ra) of the zeolite membrane 12 is, for example, 5 μm or less, preferably 2 μm or less, more preferably 1 μm or less, and yet more preferably 0.5 μm or less.

The zeolite membrane 12 has a pore diameter of, for example, greater than or equal to 0.2 nm and less than 0.4 nm, and preferably greater than or equal to 0.3 nm and less than 0.4 nm. When the zeolite membrane 12 has a pore diameter of less than 0.2 nm, the amount of gas permeation through the zeolite membrane may decrease, and when the zeolite membrane 12 has a pore diameter of greater than or equal to 0.4 nm, the zeolite membrane may have insufficient selectivity. The pore diameter of the zeolite membrane 12 refers to a diameter of a pore in a direction substantially perpendicular to a maximum diameter (i.e., a maximum value of the distance between oxygen atoms) of a pore in the zeolite constituting the zeolite membrane 12 (i.e., minor axis). When n is defined as a maximum number of membered ring in the zeolite constituting the zeolite membrane 12, the minor axis of an n-membered ring pore is defined as the pore diameter of the zeolite membrane 12. When the zeolite has a plurality of types of n-membered ring pores where n is the same number, the minor axis of an n-membered ring pore that has a largest minor axis is defined as the pore diameter of the zeolite membrane 12. The pore diameter of the zeolite membrane 12 is smaller than the mean pore diameter of the surface of the support 11 where the zeolite membrane 12 is formed. As above, various substances may be employed as the material for the support 11. For example, the support 11 is an alumina sintered compact or a mullite sintered compact.

The zeolite constituting the zeolite membrane 12 contains Al as atoms (T atoms) located in the center of an oxygen tetrahedron ($TO_4$) that constitutes the zeolite. The zeolite constituting the zeolite membrane 12 may, for example, be a zeolite in which T atoms are composed of silicon (Si) and aluminum (Al); an AlPO-type zeolite in which T atoms are composed of Al and phosphorus (P); an SAPO-type zeolite in which T atoms are composed of Si, Al, and P; an MAPSO-type zeolite in which T atoms are composed of magnesium (Mg), Si, Al, and P; or a ZnAPSO-type zeolite in which T atoms are composed of zinc (Zn), Si, Al, and P. Some of the T atoms may be replaced by other elements.

Preferably, the zeolite constituting the zeolite membrane 12 does not substantively contain P as T atoms. In other words, preferably, the zeolite does not substantively contain P as framework elements. Therefore, the heat resistance of the zeolite membrane 12 can be improved. The aforementioned words "the zeolite does not substantively contain P as framework elements" mean that a percentage of P in whole T atoms is less than or equal to 3 mol %.

When the zeolite membrane 12 contains Al and Si, an amount of substance (mol) of Si is preferably 5 times or more and 1000 times or less an amount of substance of Al. When the zeolite membrane 12 contains Al and P, an amount of substance of P is preferably 0.7 times or more and 1.5 times or less an amount of substance of Al.

The zeolite membrane 12 may contain alkali metal. The alkali metal is, for example, lithium (Li), sodium (Na), potassium (K), rubidium (Rb), or cesium (Cs). A sum of amounts of substances of whole framework elements (i.e., T atoms and oxygen), and an amount of substance of alkali metal are acquired per unit mass of the zeolite constituting the zeolite membrane 12, and the amount of substance of alkali metal is divided by the sum of amounts of substances of whole framework elements, so that a ratio of alkali metal to whole framework elements in the zeolite membrane 12 is obtained. Note that the amount of substance of oxygen contained per unit mass of the zeolite may be simply obtained by doubling the sum of amounts of substances of T atoms. When the zeolite membrane 12 contains two or more types of alkali metal, a sum of amounts of substances of whole alkali metal is assumed to be the above amount of substance of alkali metal. The ratio of the alkali metal to whole framework elements in the zeolite membrane 12 is less than or equal to 6.0 mol %, preferably less than or equal to 4.0 mol %, more preferably less than or equal to 3.5 mol %, yet more preferably less than or equal to 3.0 mol %. Because the ratio of the alkali metal is made less than or equal to 6.0 mol %, it is possible to suppress excess adsorption of $CO_2$ onto the alkali metal. As a result, it can be suppressed that $CO_2$ adsorbed on the alkali metal inhibits the permeation of $N_2$ through the separation membrane. In the zeolite membrane 12, the amount of substance of the alkali metal is less than the amount of substance of Al. The amount of the alkali metal to Al is preferably less than or equal to 90 mol %, more preferably less than or equal to 80 mol %, yet more preferably less than or equal to 70 mol %, especially preferably less than or equal to 60 mol %. The zeolite membrane 12 may not contain alkali metal. In this case, the ratio of alkali metal to whole framework elements in the zeolite membrane 12 is 0 mol %. The ratio of alkali metal to whole framework elements in the zeolite membrane 12 is more preferably greater than or equal to 0.01 mol %, yet more preferably greater than or equal to 0.05 mol %.

The zeolite membrane 12 may contain alkaline earth metal. The alkaline earth metal is, for example, calcium (Ca), strontium (Sr), barium (Ba), or radium (Ra). The sum of amounts of substances of whole framework elements (i.e., T atoms and oxygen), and an amount of substance of alkaline earth metal are acquired per unit mass of the zeolite constituting the zeolite membrane 12, and the amount of substance of alkaline earth metal is divided by the sum of amounts of substances of whole framework elements, so that a ratio of alkaline earth metal to whole framework elements in the zeolite membrane 12 is obtained. When the zeolite membrane 12 contains two or more types of alkaline earth metal, a sum of amounts of substances of whole alkaline earth metal is assumed to be the above amount of substance of alkaline earth metal. The ratio of the alkaline earth metal to whole framework elements in the zeolite membrane 12 is preferably less than or equal to 0.2 mol %, more preferably less than or equal to 0.1 mol %. Because the ratio of the alkaline earth metal is made less than or equal to 0.2 mol %, the possibility of clogging of pores by the alkaline earth metal is reduced, and it can be suppressed that the permeation of $N_2$ through the separation membrane is inhibited. The zeolite membrane 12 may not contain alkaline earth metal. In this case, the ratio of alkaline earth metal to whole framework elements in the zeolite membrane 12 is 0 mol %.

There may be a case where ratios of elements contained in a zeolite membrane are different from those of a zeolite powder even if synthesis conditions are the same. Thus, it is necessary that a composition of starting material solution and a hydrothermal synthesis condition are adjusted by actually measuring amounts of substances of elements contained in zeolite membrane 12. Amounts of substances of elements in the zeolite membrane 12 can be obtained by an energy dispersive X-ray analysis (EDS).

The sealing parts 21 are members that are mounted on the opposite ends of the support 11 in the longitudinal direction and that cover and seal the opposite end faces of the support 11 in the longitudinal direction. The sealing parts 21 prevent the inflow and outflow of gases from the opposite end faces of the support 11. Each sealing part 21 is, for example, a plate-like member formed of glass or a resin. The material and shape of the sealing part 21 may be appropriately changed. The opposite ends of each through hole 111 of the support 11 in the longitudinal direction are not covered with the sealing parts 21. This allows the inflow and outflow of gases from the opposite ends into the through holes 111.

The housing 22 is a tube-shaped member having a substantially cylindrical shape. The housing 22 is formed of, for example, stainless steel or carbon steel. The longitudinal direction (the horizontal direction in the drawing) of the zeolite membrane complex 1 is substantially parallel to the longitudinal direction of the housing 22. One end of the housing 22 in the longitudinal direction (i.e., the end on the left side in the drawing) has a gas supply port 221, and the other end thereof has a first gas exhaust port 222. The side face of the housing 22 has a second gas exhaust port 223. The gas supply port 221 is connected to the gas supply part 26. The first gas exhaust port 222 is connected to the first gas collecting part 27. The second gas exhaust port 223 is connected to the second gas collecting part 28. The internal space of the housing 22 is an enclosed space isolated from the space around the housing 22.

The seal members 23 are arranged around the entire circumference between the outer side face of the zeolite membrane complex 1 (i.e., the outer side face of the support 11) and the inner side face of the housing 22 in the vicinity of the opposite ends of the zeolite membrane complex 1 in the longitudinal direction. Each seal member 23 is a substantially circular ring-shaped member formed of a material impermeable to gases. The seal members 23 are, for example, O-rings formed of a resin having flexibility. The seal members 23 are in intimate contact with the outer side face of the zeolite membrane complex 1 and the inner side face of the housing 22 around the entire circumference. The part between the seal members 23 and the outer side face of the zeolite membrane complex 1 and the part between the seal members 23 and the inner side face of the housing 22 are sealed so as to almost or completely disable the permeation of gases.

The gas supply part 26 supplies a mixed gas containing at least $CH_4$, $CO_2$, and $N_2$ into the internal space of the housing 22 through the gas supply port 221. The gas supply part 26 includes, for example, a blower or a pump that feeds the mixed gas into the housing 22 by pressure-feeding. This blower or pump includes a pressure regulator that regulates the pressure of the mixed gas supplied to the housing 22.

The mixed gas supplied from the gas supply part 26 to the housing 22 is led into each through hole 111 of the support 11 from the left end of the zeolite membrane complex 1 in the drawing, as indicated by an arrow 251. $CO_2$ and $N_2$ in the mixed gas are led out from the outer side face of the support 11 through the zeolite membrane 12 provided on the inner side face of each through hole 111 and through the support 11 and are collected by the second gas collecting part 28 through the second gas exhaust port 223 as indicated by an arrow 253. The second gas collecting part 28 includes, for example, a reservoir that stores the gases such as $CO_2$ and $N_2$ led out of the housing 22, or a blower or a pump that transfers the permeable gases.

In the mixed gas, gases other than the gases such as $CO_2$ and $N_2$ that have passed through the zeolite membrane 12 and the support 11 (hereinafter, referred to as "impermeable gases") pass through each through hole 111 of the support 11 from the left side to the right side in the drawing and are collected by the first gas collecting part 27 through the first gas exhaust port 222 as indicated by an arrow 252. The first gas collecting part 27 includes, for example, a reservoir that stores the impermeable gases led out of the housing 22, or a blower or a pump that transfers these gases.

Figure 4:
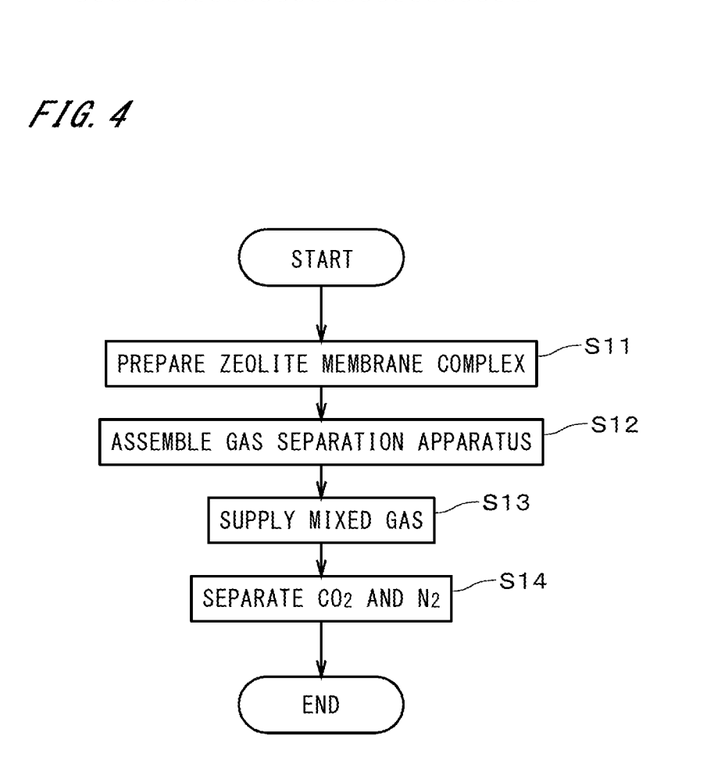
FIG. 4 is a flowchart of separation of a mixed gas.

Next, an example of the procedure for mixed-gas separation performed by the gas separation apparatus 2 will be described with reference to FIG. 4. In the mixed-gas separation, first, the zeolite membrane 12 is synthesized on the support 11, so that the zeolite membrane complex 1 is prepared (step S11). Specifically, in step S11, for example, DDR-type zeolite powder is synthesized by hydrothermal synthesis, and seed crystals are acquired from the zeolite powder. This zeolite powder may be used as-is as seed crystals, or may be processed into seed crystals by, for example, pulverization.

Then, the porous support 11 is immersed in a solution in which the seed crystals are dispersed, so that the seed crystals are deposited on the support 11. In this way, a seed-crystal-deposited support is prepared. The seed crystals may be deposited by other methods on the support 11.

The support with the seed crystals deposited thereon is immersed in a starting material solution. The starting material solution is prepared by, for example, dissolving or dispersing substances such as Si source, Al source, alkali metal source, and a structure-directing agent (hereinafter, also referred to as an "SDA") in water. The starting material solution has, for example, a composition of $100SiO_2$: $1Al_2O_3$:$2Na_2O$:3SDA:$3000H_2O$. As the SDA, for example, 1-adamantanamine may be used. Then, a DDR-type zeolite is grown by hydrothermal synthesis using the seed crystals as nuclei to form a DDR-type zeolite membrane 12 on the support 11. The temperature of the hydrothermal synthesis is preferably in the range of 120 to 200° C. and, for example, 160° C. The hydrothermal synthesis time is preferably in the range of 10 to 100 hours and, for example, 30 hours. The composition of the DDR-type zeolite membrane 12 can be adjusted by adjusting, for example, the composition ratio of the Si source, the Al source and so on in the starting material solution.

After the hydrothermal synthesis is completed, the support 11 and the zeolite membrane 12 are rinsed with deionized water. After the rinsing, the support 11 and the zeolite membrane 12 are dried at, for example, 80° C. After the support 11 and the zeolite membrane 12 have been dried, the zeolite membrane 12 is subjected to heat treatment so as to burn and remove the SDA in the zeolite membrane 12 and to cause micropores in the zeolite membrane 12 to come through the membrane. The heating temperature and heating time for the zeolite membrane 12 are, for example, 450° C. and 50 hours. Then, the zeolite membrane 12 is brought into contact with a liquid mainly composed of water for a predetermined time, so that the alkali metal in the zeolite membrane 12 is reduced. Preferably, the liquid brought into contact with the zeolite membrane 12 does not contain organic acid, for example, carboxylic acid such as acetic acid, phenols, and so on, in order to reduce clogging of the pores. The aforementioned words "the liquid does not contain organic acid" mean that a concentration of the organic acid in the liquid is less than or equal to 1 mol %. The temperature of the liquid brought into contact with the zeolite membrane 12 is preferably higher than or equal to 40° C. The pH of the liquid brought into contact with the zeolite membrane 12 is preferably greater than or equal to 4.0 and less than or equal to 6.5, in order to efficiently reduce the alkali metal in the zeolite membrane 12. The time for which the zeolite membrane 12 is in contact with the liquid is preferably 0.5 hours or more, more preferably 1 hour or more. The time for which the zeolite membrane 12 is in contact with the liquid is preferably 50 hours or less, more preferably 30 hours or less. Then, the zeolite membrane 12 is dried, and the aforementioned zeolite membrane complex 1 is obtained. At this time, the ratio of the alkali metal to whole framework elements in the zeolite of the zeolite membrane 12 is less than or equal to 6.0 mol %. In the zeolite, the amount of substance of the above alkali metal is less than the amount of substance of Al.

After step S11 is completed, the gas separation apparatus 2 shown in FIG. 1 is assembled (step S12). The zeolite membrane complex 1 is disposed in the housing 22.

Subsequently, the mixed gas containing at least $CH_4$, $CO_2$, and $N_2$ is supplied into the internal space of the housing 22 by the gas supply part 26 (step S13). In the present embodiment, the mixed gas is composed primarily of $CH_4$, $CO_2$, and $N_2$. The mixed gas may contain gases other than $CH_4$, $CO_2$, and $N_2$. Preferably, the mixed gas contains C2 or heavier hydrocarbon, in order to suppress excess adsorption of $CO_2$ onto the zeolite membrane complex 1. Additionally, when the mixed gas contains C2 or heavier hydrocarbon, an effect of increasing combustion calorie of the impermeable gases described later can also be expected.

The pressure of the mixed gas supplied into the internal space of the housing 22 from the gas supply part 26 (i.e., gas introduction pressure) is greater than or equal to 10 atm (1.013 MPa) and less than or equal to 200 atm (20.265 MPa). The temperature of the mixed gas is preferably higher than or equal to 40° C. and lower than or equal to 200° C. The concentration of $CO_2$ (i.e., mol % of $CO_2$) in the mixed gas is preferably greater than or equal to 10%. The concentration of $N_2$ (i.e., mol % of $N_2$) in the mixed gas is preferably greater than or equal to 3%. Additionally, the water content of the mixed gas is less than or equal to 3000 ppm. When the water content of the gas is greater than 3000 ppm, the mixed gas whose water content is adjusted to 3000 ppm or less by a dehydration apparatus or the like is used.

The mixed gas supplied into the housing 22 is led into each through hole 111 of the zeolite membrane complex 1. $CO_2$ and $N_2$ in the mixed gas permeate the zeolite membrane complex 1 (i.e., they permeate the zeolite membrane 12 and the support 11), thereby to be simultaneously and efficiently separated from $CH_4$ in the mixed gas (step S14). $CO_2$ and $N_2$ which have permeated the zeolite membrane complex 1 are collected by the second gas collecting part 28. The pressure in the second gas collecting part 28 may be set arbitrarily, and the pressure is, for example, approximately 1 atm (0.101 MPa). The gas collected by the second gas collecting part 28 may contain gases other than $CO_2$ and $N_2$.

The impermeable gases (i.e., gases, in the mixed gas, other than the gases such as $CO_2$ and $N_2$ that have permeated the zeolite membrane complex 1) pass through each through hole 111 and are collected by the first gas collecting part 27. The pressure in the first gas collecting part 27 is, for example, the same pressure as the gas supply part 26. The impermeable gases collected by the first gas collecting part 27 may contain $CO_2$ and $N_2$ that have not permeated the zeolite membrane complex 1. The impermeable gases may contain gases other than $CH_4$, $CO_2$, and $N_2$.

Next, the relationship between a composition of mixed gas except for water and removal percentages of $CO_2$ and $N_2$ will be described with reference to Table 1. In Cases 1 to 5 shown in Table 1, compositions of mixed gases supplied from the gas supply part 26 to the gas separation apparatus 2 (i.e., compositions of mixed gases before removal of $CO_2$ and $N_2$ by the gas separation apparatus 2) are different from one another. Each pressure of mixed gas in Table 1 is a pressure of the mixed gas supplied from the gas supply part 26 to the gas separation apparatus 2. Although the pressure in the second gas collecting part 28 (i.e., the pressure at permeation side) is not shown in Table 1, the pressure in all Cases is 1 atm. The water content of the mixed gas supplied from the gas supply part 26 to the gas separation apparatus 2 is 3000 ppm.

The removal percentage of $CO_2$ in Table 1 is a percentage of an amount of substance of $CO_2$ collected by the second gas collecting part 28 to an amount of substance of $CO_2$ in the mixing gas supplied to the gas separation apparatus 2. The removal percentage of $N_2$ in Table 1 is a percentage of an amount of substance of $N_2$ collected by the second gas collecting part 28 to an amount of substance of $N_2$ in the mixing gas supplied to the gas separation apparatus 2.

TABLE 1

|  | Mixed Gas (mol %) | | | Pressure of Mixed Gas | Removal Percentage of $CO_2$ | Removal Percentage of $N_2$ |
| --- | --- | --- | --- | --- | --- | --- |
|  | $CH_4$ | $CO_2$ | $N_2$ | (atm) | (%) | (%) |
| Case 1 | 87 | 10 | 3 | 10 | 62 | 30 |
| Case 2 | 67 | 30 | 3 | 10 | 77 | 31 |
| Case 3 | 60 | 10 | 30 | 30 | 90 | 30 |
| Case 4 | 75 | 15 | 10 | 50 | 93 | 30 |
| Case 5 | 35 | 50 | 15 | 90 | 98 | 32 |

As shown in Table 1, the concentration of $CO_2$ in the mixed gas is greater than or equal to 10%, and the concentration of $N_2$ in the mixed gas is greater than or equal to 3%. The removal percentage of $CO_2$ was greater than or equal to 60%, and the removal percentage of $N_2$ was greater than or equal to 30%. In other words, the zeolite membrane 12 which is the separation membrane allows 60% or more of $CO_2$ and 30% or more of $N_2$ in the mixed gas to permeate therethrough, to thereby separate them from the mixed gas. Regarding Cases 1 to 5, it was confirmed that the removal percentages of $CO_2$ and $N_2$ were equivalent to or increased from the results shown in Table 1 in the case where the water content of the mixed gas was made less than 3000 ppm.

As described above, the gas separation apparatus 2 includes the gas supply part 26 and a separation membrane (the zeolite membrane 12 in the above example). The gas supply part 26 supplies a mixed gas at a pressure greater than or equal to 10 atm and less than or equal to 200 atm. The mixed gas contains at least $CH_4$, $CO_2$, and $N_2$. The water content of the mixed gas is made less than or equal to 3000 ppm. The above separation membrane allows $CO_2$ and $N_2$ in the mixed gas to permeate therethrough, to thereby separate $CO_2$ and $N_2$ from $CH_4$. The separation membrane is made of zeolite, and the zeolite contains Al. The ratio of alkali metal to whole framework elements in the zeolite is less than or equal to 6.0 mol %. In the zeolite, the amount of substance of the alkali metal is less than the amount of substance of Al.

In the gas separation apparatus 2, it is possible to simultaneously and efficiently separate $CO_2$ and $N_2$ in the mixed gas by using the separation membrane containing the zeolite, as described above. Additionally, excess adsorption of $CO_2$ on the alkali metal can be suppressed. As a result, it can be suppressed that $CO_2$ adsorbed on the alkali metal inhibits the permeation of $N_2$ through the separation membrane. Consequently, both $CO_2$ and $N_2$ can be efficiently separated. Note that the zeolite may not contain alkali metal. Also in this case, both $CO_2$ and $N_2$ can be efficiently separated as above.

Note that the pressure of the mixed gas supplied from the gas supply part 26 is greater than or equal to 10 atm and less than or equal to 200 atm. The pressure of the mixed gas is preferably greater than or equal to 10 atm and less than or equal to 150 atm, more preferably greater than or equal to 10 atm and less than or equal to 100 atm. The ratio of alkali metal to whole framework elements in the zeolite is preferably less than or equal to 4.0 mol %, more preferably less than or equal to 3.5 mol %, yet more preferably less than or equal to 3.0 mol %.

Preferably, the concentration of $CO_2$ in the mixed gas is greater than or equal to 10%, and the concentration of $N_2$ in the mixed gas is greater than or equal to 3%. In this case, $CO_2$ and $N_2$ in the mixed gas can be separated more efficiently and simultaneously.

The temperature of the mixed gas is preferably higher than or equal to 40° C. and lower than or equal to 200° C. It is therefore possible to simultaneously and more efficiently separate $CO_2$ and $N_2$ in the mixed gas.

Preferably, the mixed gas further contains C2 or heavier hydrocarbon. This suppresses excess adsorption of $CO_2$ and increases combustion calorie of the impermeable gases.

Preferably, the separation membrane allows 60% or more of $CO_2$ and 30% or more of $N_2$ in the mixed gas to permeate therethrough. By this efficient separation of $CO_2$ and $N_2$ in the mixed gas, the concentration of $CH_4$ in the mixing gas can be increased to a practicable level.

In the gas separation apparatus 2, the above separation membrane is a membrane of the above zeolite (i.e., the zeolite membrane 12) formed on the porous support 11. Thus, the separation membrane containing the zeolite can be formed easily. Because the zeolite membrane 12 is supported on the support 11, it is possible to facilitate the handling of the zeolite membrane 12.

As described above, the maximum number of membered ring in the zeolite contained the separation membrane is 6 or 8. This suppresses the permeation of $CH_4$ in the mixed gas through the separation membrane. As a result, the separation membrane appropriately achieves selective permeation of $CO_2$ and $N_2$ in the mixed gas, thereby to more efficiently separate $CO_2$ and $N_2$.

In the gas separation apparatus 2, the zeolite contained in the above separation membrane preferably contains Al, and Si or P. In this case, preferably the amount of substance of Si is 5 times or more and 1000 times or less the amount of substance of Al, or the amount of substance of P is 0.7 times or more and 1.5 times or less the amount of substance of Al. In the case where the zeolite contains Al and Si, because the amount of substance of Si having a quadrivalent is made 5 times or more the amount of substance of Al having trivalent, the zeolite can appropriately approach electrical neutrality. With this, adsorption of water molecules into the zeolite can be suppressed. As a result, it can be suppressed that water molecules adsorbed in the zeolite inhibits the permeation of $CO_2$ and $N_2$ through the separation membrane. Consequently, efficient separation of $CO_2$ and $N_2$ is achieved.

In the case where the zeolite contains Al and P, because the amount of substance of P having a pentavalent is made 1.5 times or less the amount of substance of Al having trivalent, the zeolite can appropriately approach electrical neutrality. With this, adsorption of water molecules into the zeolite can be suppressed. As a result, it can be suppressed that water molecules adsorbed in the zeolite inhibits the permeation of $CO_2$ and $N_2$ through the separation membrane. Consequently, efficient separation of $CO_2$ and $N_2$ is achieved.

As described above, the method of gas separation includes the step (step S13) of supplying a mixed gas containing at least $CH_4$, $CO_2$, and $N_2$ at a pressure greater than or equal to 10 atm and less than or equal to 200 atm, and the step (step S14) of allowing $CO_2$ and $N_2$ in the mixed gas to permeate the separation membrane, to thereby separate $CO_2$ and $N_2$ from $CH_4$. The water content of the mixed gas is made less than or equal to 3000 ppm. The above separation membrane is made of zeolite, and the zeolite contains Al. The ratio of alkali metal to whole framework elements in the zeolite is less than or equal to 6.0 mol %. In the zeolite, the amount of substance of the alkali metal is less than the amount of substance of Al. It is therefore possible to simultaneously and efficiently separate $CO_2$ and $N_2$ in the mixed gas by using the separation membrane containing the zeolite, as described above.

Preferably, the concentration of $CO_2$ in the mixed gas is greater than or equal to 10%, and the concentration of $N_2$ in the mixed gas is greater than or equal to 3%. Preferably, the mixed gas further contains C2 or heavier hydrocarbon.

The above method of gas separation further includes the step (step S11) of synthesizing the above zeolite before step S13. In the method of gas separation, the zeolite is brought into contact with a liquid mainly composed of water for a predetermined time in step S11, the liquid having a pH greater than or equal to 4.0 and less than or equal to 6.5 and having a temperature higher than or equal to 40° C. Accordingly, the amount of substance of the alkali metal in the zeolite can be reduced. As a result, it is possible to suppress excess adsorption of $CO_2$ on the alkali metal, to thereby suppress that $CO_2$ adsorbed on the alkali metal inhibits the permeation of $N_2$ through the separation membrane. Consequently, both $CO_2$ and $N_2$ can be efficiently separated.

The above-described gas separation apparatus 2 and the above-described method of gas separation may be modified in various ways.

For example, the zeolite membrane 12 may be a zeolite membrane other than DDR-type, as described above. Actually, it is confirmed that a CHA-type zeolite membrane which is formed on a support 11 with reference to Comparative Example 2 in Japanese Patent Application Laid-Open No. 2014-198308, an AEI-type zeolite membrane which is formed on a support 11 with reference to International Publication WO 2014/157324, and the like can simultaneously and efficiently separate both $CO_2$ and $N_2$ from the mixed gases shown in Table 1 as the above DDR-type zeolite membrane 12.

For example, in the zeolite contained in the separation membrane of the gas separation apparatus 2, the amount of substance of the alkali metal may be greater than or equal to the amount of substance of Al. In the zeolite, the amount of substance of Si may be less than 5 times or more than 1000 times the amount of substance of Al. The amount of substance of P may be less than 0.7 times or more than 1.5 times the amount of substance of Al. The zeolite does not necessarily have to contain Al and to contain Si or P. The maximum number of membered ring in the zeolite may be more than 8.

The above separation membrane does not necessarily have to be the zeolite membrane 12 formed on the porous support 11. The shape, structure and the like of the separation membrane may be modified in various ways, as long as it is a film-like member containing a zeolite. For example, the entire separation membrane does not necessarily have to be formed of zeolite, and part of the separation membrane may be formed of zeolite. The zeolite contained in the separation membrane may contain one type of zeolite, or two or more types of zeolites having different structures and compositions.

The structure of the gas separation apparatus 2 may be modified in various ways, as long as it includes the above gas supply part 26 and the separation membrane.

In step S11 of the method of gas separation, the temperature of the liquid brought into contact with the zeolite membrane 12 after removal of the SDA may be lower than 40° C. The pH of the liquid brought into contact with the zeolite membrane 12 after removal of the SDA may be less than 4.0 or greater than 6.5. The step of bringing the zeolite membrane 12 after removal of the SDA into contact with the liquid may be omitted.

The zeolite membrane complex 1 may further include a functional membrane or a protective membrane laminated on the zeolite membrane 12, in addition to the support 11 and the zeolite membrane 12. Such a functional or protective membrane may be an inorganic membrane such as a zeolite membrane, a silica membrane, or a carbon membrane, or may be an organic membrane such as a polyimide membrane or a silicone membrane. Alternatively, a substance that can easily adsorb $CO_2$ may be added to the functional or protective membrane laminated on the zeolite membrane 12.

The configurations of the above-described preferred embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The gas separation apparatus according to the present invention can be used as an apparatus for separating $CO_2$ and $N_2$ in a gas from, for example, a partial combustion furnace, and can be used for the separation of other various mixed gases.

REFERENCE SIGNS LIST

2 Gas separation apparatus
11 Support
12 Zeolite membrane
26 Gas supply part
S11 to S14 Step

The invention claimed is:

1. A gas separation apparatus comprising:
a gas supply part that supplies a mixed gas containing at least methane, carbon dioxide, and nitrogen; and
a separation membrane that allows 60% or more of carbon dioxide and 30% or more of nitrogen in said mixed gas to permeate therethrough, to thereby separate carbon dioxide and nitrogen from methane, wherein
said separation membrane is made of zeolite,
said zeolite contains aluminum,
a ratio of alkali metal to whole framework elements in said zeolite is less than or equal to 6.0 mol %,
an amount of substance of said alkali metal in said zeolite is less than an amount of substance of said aluminum, and
a ratio of alkaline earth metal to whole framework elements in said zeolite is less than or equal to 0.2 mol %.

2. The gas separation apparatus according to claim 1, wherein
a concentration of carbon dioxide in said mixed gas is greater than or equal to 10%, and a concentration of nitrogen in said mixed gas is greater than or equal to 3%.

3. The gas separation apparatus according to claim 1, wherein
a pressure of said mixed gas is greater than or equal to 10 atm and less than or equal to 200 atm.

4. The gas separation apparatus according to claim 1, wherein
a water content of said mixed gas is less than or equal to 3000 ppm.

5. The gas separation apparatus according to claim 1, wherein
said separation membrane is a membrane of said zeolite formed on a porous support.

6. The gas separation apparatus according to claim 1, wherein
a maximum number of membered ring in said zeolite is 6 or 8.

7. The gas separation apparatus according to claim 1, wherein
said zeolite contains:
aluminum; and
silicon, wherein an amount of substance of said silicon is 5 times or more and 1000 times or less an amount of substance of said aluminum, or
phosphorus, wherein an amount of substance of said phosphorus is 0.7 times or more and 1.5 times or less an amount of substance of said aluminum.

8. A method of gas separation comprising:
a) supplying a mixed gas containing at least methane, carbon dioxide, and nitrogen; and
b) allowing 60% or more of carbon dioxide and 30% or more of nitrogen in said mixed gas to permeate a separation membrane, to thereby separate carbon dioxide and nitrogen from methane, wherein
said separation membrane is made of zeolite,
said zeolite contains aluminum,
a ratio of alkali metal to whole framework elements in said zeolite is less than or equal to 6.0 mol %,
an amount of substance of said alkali metal in said zeolite is less than an amount of substance of said aluminum, and
a ratio of alkaline earth metal to whole framework elements in said zeolite is less than or equal to 0.2 mol %.

9. The method of gas separation according to claim 8, wherein
a concentration of carbon dioxide in said mixed gas is greater than or equal to 10%, and a concentration of nitrogen in said mixed gas is greater than or equal to 3%.

10. The method of gas separation according to claim 8, wherein
a pressure of said mixed gas is greater than or equal to 10 atm and less than or equal to 200 atm.

11. The method of gas separation according to claim 8, wherein
a water content of said mixed gas is less than or equal to 3000 ppm.

12. The method of gas separation according to claim 8, wherein
a maximum number of membered ring in said zeolite is 6 or 8.

13. The method of gas separation according to claim 8, wherein
said zeolite contains:
aluminum; and
silicon, wherein an amount of substance of said silicon is 5 times or more and 1000 times or less an amount of substance of said aluminum, or
phosphorus, wherein an amount of substance of said phosphorus is 0.7 times or more and 1.5 times or less an amount of substance of said aluminum.

* * * * *